US008302279B1

(12) United States Patent
Hofer

(10) Patent No.: US 8,302,279 B1
(45) Date of Patent: Nov. 6, 2012

(54) DOORFRAME REMOVING METHOD AND APPARATUS

(76) Inventor: Orlando S. Hofer, Hartford, SD (US)

( * ) Notice: Subject to any disclaimer, the term of this patent is extended or adjusted under 35 U.S.C. 154(b) by 351 days.

(21) Appl. No.: 12/813,826

(22) Filed: Jun. 11, 2010

Related U.S. Application Data

(62) Division of application No. 11/363,454, filed on Feb. 28, 2006, now abandoned.

(51) Int. Cl.
*B25B 27/14* (2006.01)
*B23P 11/00* (2006.01)

(52) U.S. Cl. ............. 29/426.5; 29/252; 29/270; 254/30; 254/93 R

(58) Field of Classification Search .................... 29/252, 29/255, 270, 426.5; 254/29-31, 132, 93 H, 254/93 R, 89 HP
See application file for complete search history.

(56) References Cited

U.S. PATENT DOCUMENTS

| | | | | | |
|---|---|---|---|---|---|
| 1,581,057 | A | | 4/1926 | Hill | |
| 3,610,022 | A | | 10/1971 | Lincourt | |
| 3,647,185 | A | * | 3/1972 | Phibbs | 254/30 |
| 4,256,286 | A | * | 3/1981 | Hudgins | 254/30 |
| 4,746,096 | A | * | 5/1988 | Donnell et al. | 254/29 R |
| 5,159,743 | A | | 11/1992 | Somerville | |
| 5,377,462 | A | * | 1/1995 | Beals et al. | 52/127.2 |
| 5,419,027 | A | | 5/1995 | McPeak et al. | |
| 5,535,973 | A | | 7/1996 | Bailey et al. | |
| 5,971,362 | A | * | 10/1999 | Clark | 254/100 |
| 6,247,216 | B1 | * | 6/2001 | Rader, Jr. | 29/252 |
| 6,398,188 | B1 | * | 6/2002 | Salman | 254/30 |
| 6,526,796 | B1 | | 3/2003 | Markarian | |
| 6,527,250 | B1 | * | 3/2003 | Tyson | 254/30 |
| 6,581,261 | B1 | | 6/2003 | Chen | |
| 6,631,541 | B2 | | 10/2003 | Mosing et al. | |
| 6,895,646 | B1 | | 5/2005 | Houg | |
| 7,089,641 | B2 | * | 8/2006 | Hamerski | 29/238 |
| 7,299,590 | B1 | * | 11/2007 | Gibbs | 52/127.2 |
| 2002/0063245 | A1 | * | 5/2002 | Salman | 254/30 |

* cited by examiner

*Primary Examiner* — Lee D Wilson

(57) ABSTRACT

A doorframe removing apparatus includes an end wall. A pair of legs each has a first end a second end. The first ends are attached to the end wall. The legs are orientated substantially parallel to each other. An end wall coupler is attached to the first side of the end wall. A frame coupler is removably attached to a doorframe attached to a perimeter edge of a door orifice in a wall. An urging member is removably attached to and extends between the end wall coupler and the frame coupler. The urging member is configured to urge the frame coupler toward the end wall coupler. The second ends of the legs are positioned on opposite sides of the doorframe and supported against the perimeter edge. The urging member is actuated to pull the doorframe away from the perimeter edge of the door orifice.

2 Claims, 4 Drawing Sheets

FIG. 1
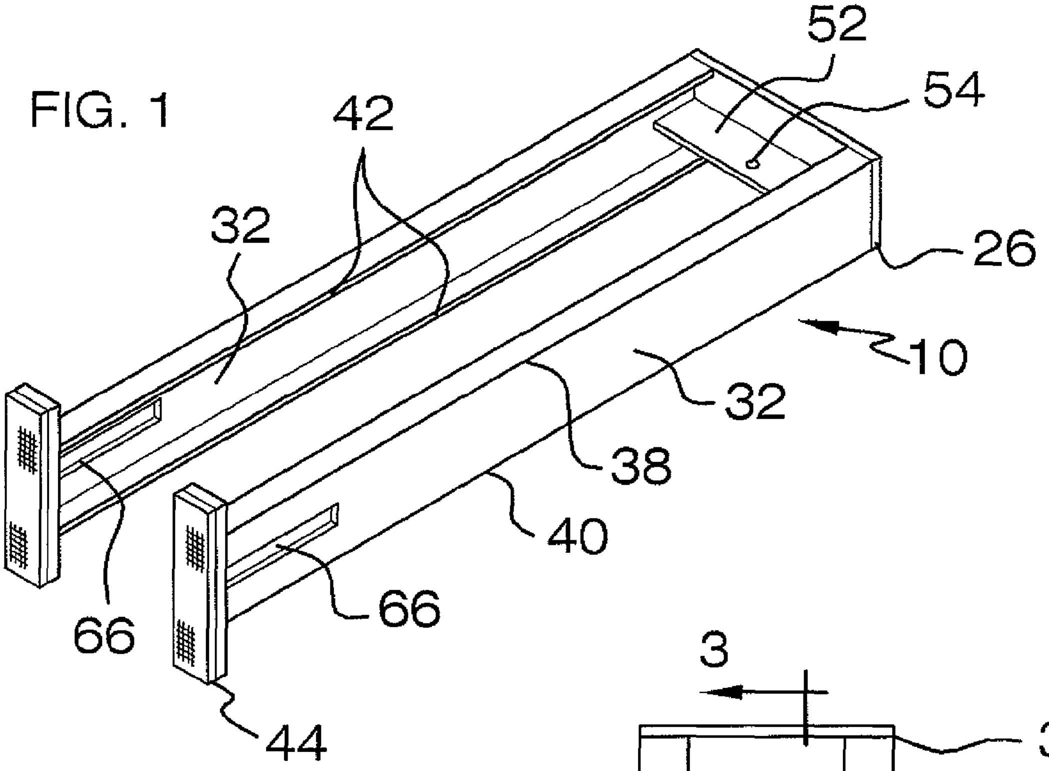
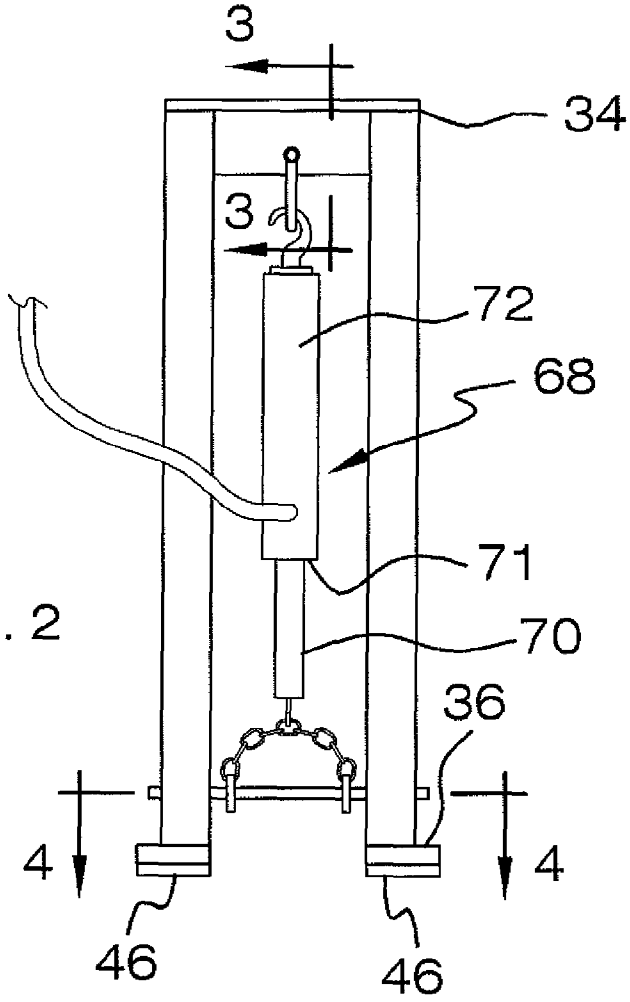
FIG. 2

DOORFRAME REMOVING METHOD AND APPARATUS

This application is a divisional application of U.S. patent application Ser. No. 11/363,454 filed on Feb. 28, 2006 now abandoned, and claiming the benefit of that application under 35 U.S.C. 365(c).

BACKGROUND OF THE INVENTION

1. Field of the Invention

The present invention relates to doorframe removing methods and more particularly pertains to a new doorframe removing method for removing a doorframe from a masonry type wall.

2. Description of the Prior Art

The use of doorframe removing methods is known in the prior art, and in particular methods are known for removing metal doorframes from masonry walls. Typically, these doorframes are removed by drilling out and/or cutting out the mortar between the doorframe and the wall. This process is performed along the entire length of the doorframe until the doorframe is unattached to the wall.

The method described above has many disadvantages. A first of these is the manpower required to cut a doorframe away from a wall. Since the mortar, and any bolts used to secure the doorframe in place, is very strong and difficult to cut, many man-hours are required to cut along the entire doorframe.

A second, and more concerning problem, is the airborne particles released during the cutting process. The airborne particles may be dangerous to workers who could inhale them and thus a worksite, where a doorframe is being removed, must be shut down, sealed and ventilated with expensive ventilators. Further, the workers performing the task of doorframe removal must wear air filtering masks, eye coverings and body suits. Finally, such cutting tasks cannot generally be performed in clean-room environments due to the amount of mortar and masonry dust ejected into the air.

For the above reasons, a new method and apparatus are required that does not cause the airborne displacement of masonry and mortar dust. Further, the new method and apparatus should also reduce the amount of time required for removing a doorframe from a masonry wall.

SUMMARY OF THE INVENTION

The present invention meets the needs presented above by generally including the steps of providing a doorframe mounted to a perimeter edge of a door orifice positioned within a wall. An end wall and a pair of legs are provided. Each of the legs has a first end and a second end. The first ends are attached to the end wall and the legs are orientated substantially parallel to each other and extend in a same direction with respect to the end wall. The first ends of the legs are spaced from each other. An end wall coupler is attached to the end wall and a frame coupler is removably attached to the doorframe. An urging member is provided that is removably attached to and extends between the end wall coupler and the frame coupler. The urging member is configured for urging the frame coupler toward the end wall coupler. The second ends of the legs are positioned on opposite sides of the doorframe and supported against the perimeter edge. The urging member is actuated to pull the doorframe away from the perimeter edge of the door orifice.

The present invention further meets the needs presented above by generally comprising an end wall having a first side and a second side. A pair of legs each has a first end and a second end. The first ends are attached to the first side of the end wall. The legs are orientated substantially parallel to each other and the first ends of the legs are spaced from each other. An end wall coupler is attached to the first side of the end wall. A frame coupler is removably attached to a doorframe attached to a perimeter edge of a door orifice in a wall. An urging member is removably attached to and extends between the end wall coupler and the frame coupler. The urging member is configured to urge the frame coupler toward the end wall coupler. The second ends of the legs are positioned on opposite sides of the doorframe and supported against the perimeter edge. The urging member is actuated to pull the doorframe away from the perimeter edge of the door orifice.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a doorframe removing method and apparatus according to the present invention.

FIG. 2 is a top view of the present invention.

DESCRIPTION OF THE PREFERRED EMBODIMENT

Figure 3:
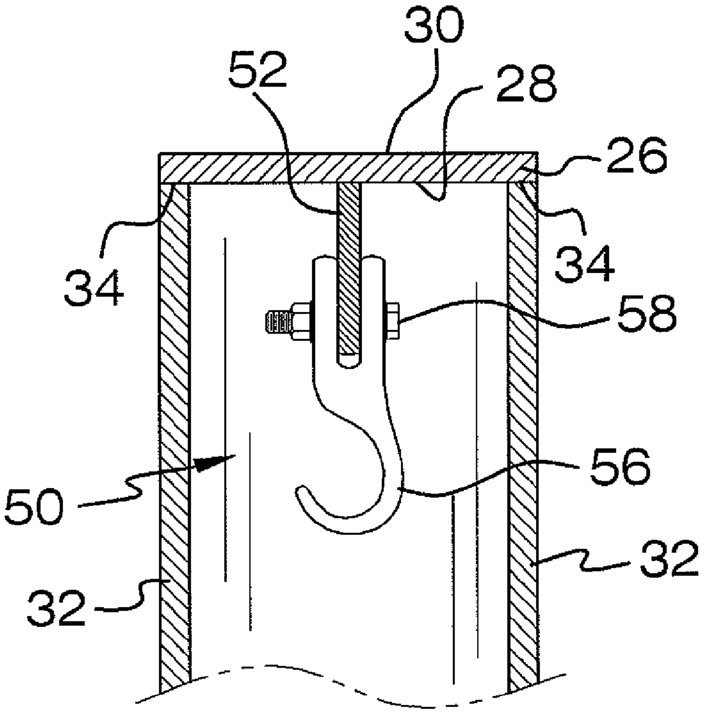
FIG. 3 is a cross-sectional view taken along line 3-3 of FIG. 2 of the present invention.
Figure 4:
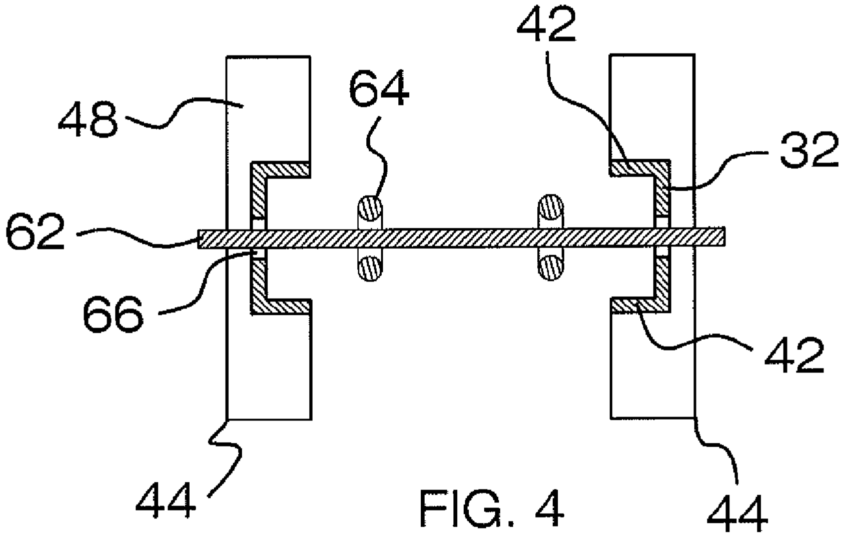
FIG. 4 is a cross-sectional view taken along line 4-4 of FIG. 2 of the present invention.
Figure 5:
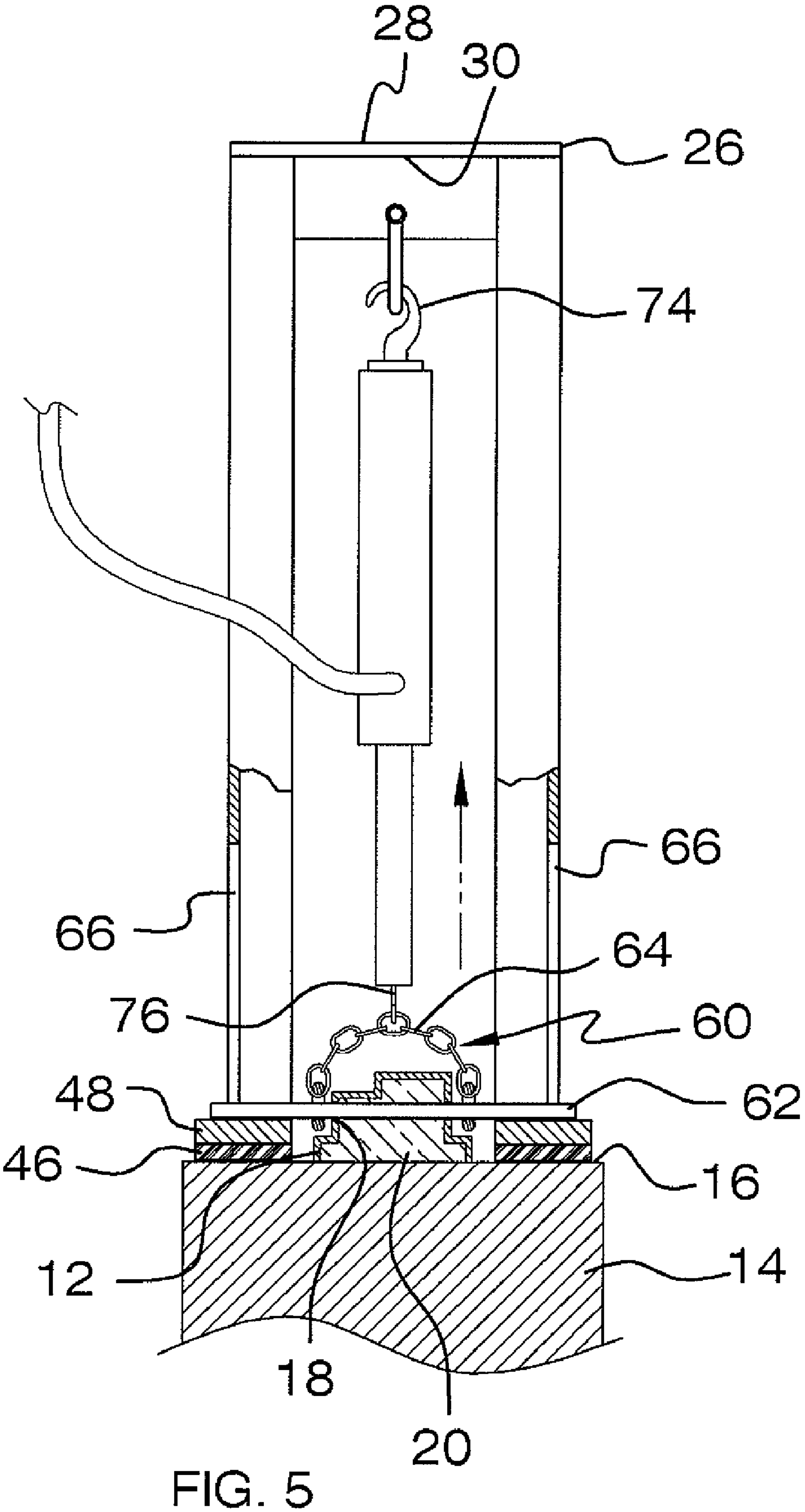
FIG. 5 is a broken top view of the present invention.
Figure 6:
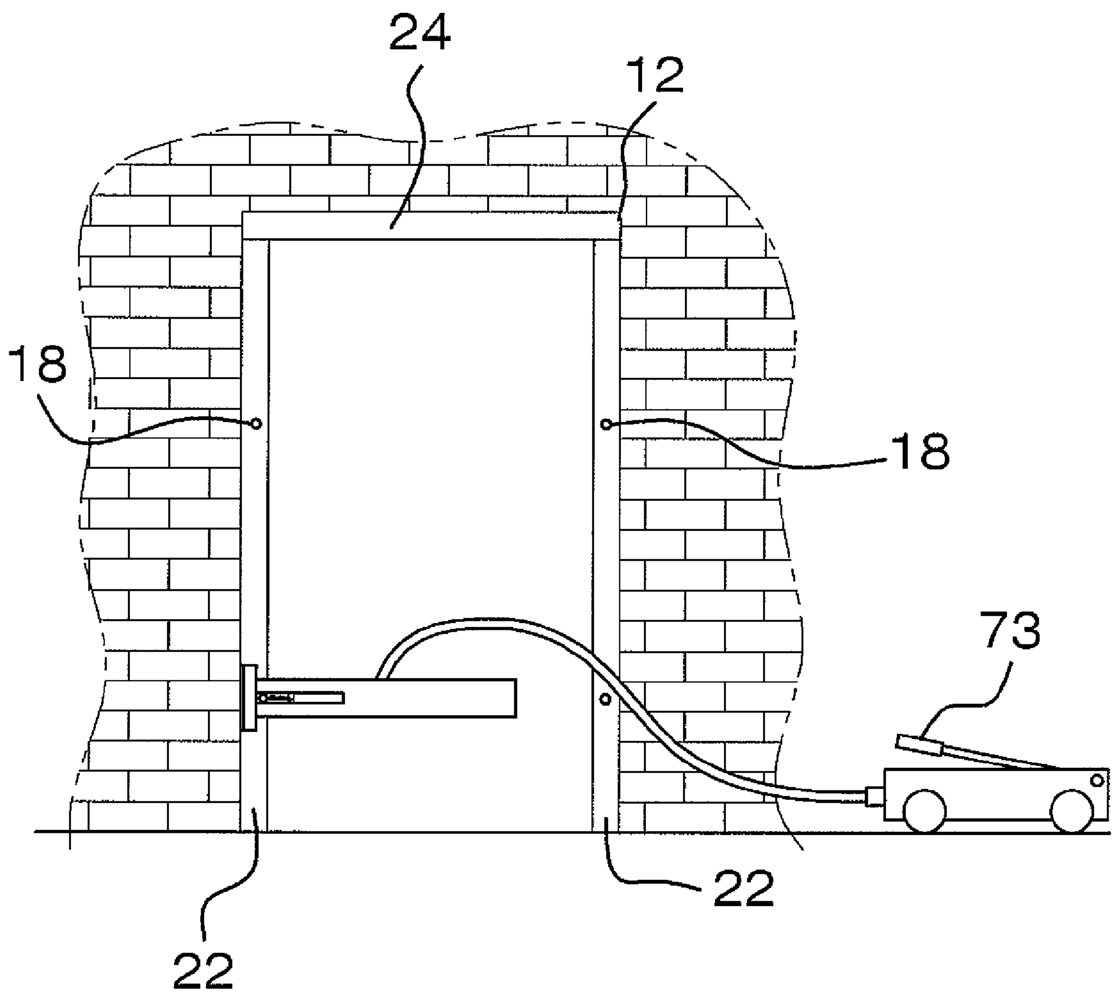
FIG. 6 is a side in-use view of the present invention.

With reference now to the drawings, and in particular to FIGS. 1 through 6 thereof, a new doorframe removing method embodying the principles and concepts of the present invention and generally designated by the reference numeral 10 will be described.

As best illustrated in FIGS. 1 through 6, the doorframe removing method and apparatus 10 generally comprises providing a doorframe 12 mounted to a perimeter edge 14 of a door orifice positioned within a wall 16. The wall 16 is preferably comprised of a masonry block material such as, but not limited to, cinder block, stone, or brick materials. The doorframe 12 is attached to the wall in a conventional manner, which includes the use of mortar 20. The doorframe 12 may be comprised of a metallic frame that is substantially hollow, though the doorframe 12 will likely be filled with mortar 20 when the doorframe 12 is attached to the wall 16. The doorframe 12 typically has a width smaller than a width of the perimeter edge 14.

The doorframe 12 includes at least one, and preferably a plurality, of openings 18 formed therein for attachment to the apparatus 10. The openings 18 each extend through the doorframe 12 and are substantially horizontally aligned. The openings 18 are spaced from the perimeter edge 16 and lie in a plane orientated substantially parallel to a plane of an adjacent portion of the perimeter edge 16. The openings 18 may be made with a drill bit that is extended through opposite sides of the doorframe 12 and may require one drill bit for the metallic doorframe 12 and a second drill bit for the mortar 20 in the doorframe 12. The openings are vertically spaced from each other on vertical portions 22 of the doorframe 12 a distance of between 2 feet and 4 feet. Another opening 18 may be positioned in a horizontal portion 24 of the doorframe 12. The openings 18 serve as connection points for the apparatus 10 during the pulling of the doorframe off 12 of the wall 14 and therefore the number and positioning of the openings 18 may be determined by the size of the doorframe.

The apparatus 10 includes an end wall 26 that has a first side 28 and a second side 30. A pair of legs 32 is provided and each has a first end 34 and a second end 36. Each of the first ends 34 is attached to the first side 28 of the end wall 26. The legs 32 are orientated substantially parallel to each other and the first ends 34 of the legs 32 are spaced from each other. The legs 32 extend in a same direction with respect to the end wall 26. A distance between the second ends 36 is greater than the width of the doorframe 12. The legs 32 each have an upper edge 38 and a lower edge 40. Supporting plates 42 may be integrally attached to and be coextensive with each of the upper 38 and lower edges 40 to increase the strength of the legs 32 and to prevent their buckling. The legs 32 each have a length from their first ends 34 to their second ends 36 between about 2 feet and 3½ feet.

A pair of foot panels 44 is also provided. Each of the second ends 36 has one of the foot panels 44 attached thereto. The foot panels 44 each lie in a plane orientated parallel to a plane of the end wall 26. A distance between the foot panels 44 is greater than the width of the doorframe 12 so that the foot panels 44 may be positioned on either side of the doorframe 12. The supporting plates 42 are integrally coupled to and extend between the end wall 26 and corresponding ones of the foot panels 44. Each of the foot panels 44 has a free side 46 positioned opposite of the legs and comprising a gripping material. The gripping material may comprise a resiliently compressible material such an elastomer. An attached side 48 of each of the foot panels 44, which are attached to the legs 32, may be comprised of a metallic material.

An end wall coupler 50 is attached to the first side 28 of the end wall 26. The end wall coupler 50 includes a plate 52 integrally coupled to the first side 28 of the end wall 26 and is positioned between the legs 32. The plate 52 may extend between and be integrally coupled to the legs 32. The plate 52 has an aperture 54 extending therethrough. A catch 56 is attached to the plate 52 by a fastener 58 extending through the aperture 54. The catch 56 is preferably hook-shaped.

A frame coupler 60 is removably attached to the doorframe 12. The frame coupler 60 includes a rod 62 extending through one of the openings 18 in the doorframe 12. The frame coupler 60 further includes a chain 64 that is attached to the rod 62. The rod 62 may extend into slots 66 oppositely positioned in the legs 32 and extending through the legs 32. Each of the slots 66 is elongated and extends from a corresponding one of the second ends 36 and toward the end wall 26. The slots 66 are substantially horizontally orientated when the end wall 30 is substantially vertically orientated.

An urging member 68 is removably attached to and extends between the end wall coupler 50 and the frame coupler 60. The urging member 68 is configured to urge the frame coupler 60 toward the end wall coupler 50. The urging member 68 has an overall length that is shortened when the urging member 68 is actuated. The urging member 68 includes a piston 70 slidably extending into a receiving end 71 of a cylinder 72. A pump 73 is fluidly coupled to the cylinder 72. The piston 70 is pulled into the cylinder 72 when the pump 73 is actuated. This may be conventionally accomplished by forcing fluid, such as a gas (pneumatic contraction jack) or liquid (hydraulic contraction jack), into the cylinder 72 between a chamber formed between the receiving end and a seal attached to an inserted end of the piston 70 positioned within the cylinder 72. Upon releasing of the fluid from the cylinder 72, the piston 70 would be allowed to extend outwardly of the cylinder 72. A first hook 74 is attached to the cylinder 72 and is engaged with the catch 56. A second hook 76 is attached to the piston 70. The second hook 76 is attached to the chain 64.

In use, the rod 62 is extended through one of the openings 18 and the chain 64 attached to the rod 62 so that the chain 64 has opposite ends positioned on opposite sides of (or outside of) the doorframe 12. The second ends 36 of the legs 32 are positioned on opposite sides of the doorframe 12 and the foot panels 44 abutted against the perimeter edge 16. Actuation of the apparatus 10 is accomplished by pumping the pump 73. This pulls the piston 70 into the cylinder 72, which in turn pulls the rod 62 toward the end wall 26. Since the wall 14 supports the legs 32 and prevents their movement with respect to the end wall 26, a portion of the doorframe 12 is pulled toward the end wall 26 and away from and off of the perimeter edge 16 of the door orifice. The process is then repeated using the other openings 18 until the doorframe 12 is completely removed from the perimeter edge 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of removing a frame, said method comprising the steps of:

- providing a doorframe mounted to a perimeter edge of a door orifice positioned within a wall;
- providing an end wall;
- providing a pair of legs, each of said legs having a first end and a second end, each of said first ends being attached to said end wall, said legs being orientated substantially parallel to each other and extending in a same direction with respect to said end wall, said first ends of said legs being spaced from each other;
- providing an end wall coupler being attached to said end wall;
- attaching a frame coupler to said doorframe;
- providing an urging member being removably attached to and extending between said end wall coupler and said frame coupler, said urging member being configured to urge said frame coupler toward said end wall coupler;
- positioning said second ends of said legs on opposite sides of said doorframe and supporting said legs against said perimeter edge; and actuating said urging member and pulling said doorframe away from said perimeter edge of said door orifice.

2. A method of removing a frame, said method comprising the steps of:

providing a doorframe mounted to a perimeter edge of a door orifice positioned within a wall, said doorframe having a width smaller than a width of said perimeter edge;

forming an opening extending through said doorframe, said opening in said doorframe being substantially horizontally orientated;

providing an end wall having a first side and a second side;

providing a pair of legs, each of said legs having a first end and a second end, each of said first ends being attached to said first side of said end wall, said legs being orientated substantially parallel to each other, said first ends of said legs being spaced from each other, a distance between said second ends being greater than said width of said doorframe;

providing a pair of foot panels, each of said second ends having one of said foot panels attached thereto, each of said foot panels lying in a plane orientated parallel to a plane of said end wall, a distance between said foot panels being greater than said width of said doorframe, each of said foot panels having a free side positioned opposite of said legs and comprising a gripping material, said gripping material comprising a resiliently compressible material;

providing an end wall coupler being attached to said first side of said end wall, said end wall coupler including a plate integrally coupled to said first side of said end wall and being positioned between said legs, said plate having an aperture extending therethrough, a catch being attached to said plate by a fastener extending through said aperture;

extending a frame coupler through said opening, said frame coupler including a rod extended through said opening, said frame coupler further including a chain being attached to said rod;

extending said rod into slots oppositely positioned in said legs, said slots extending through said legs, each of said slots being elongated and extending from a corresponding one of said second ends and toward said end wall;

providing an urging member being removably attached to and extending between said end wall coupler and said frame coupler, said urging member being configured to urge said frame coupler toward said end wall coupler, said urging member including a piston slidably extending into a cylinder, a pump being fluidly coupled to said cylinder, said piston being pulled into said cylinder when said pump is actuated, a first hook being attached to said cylinder and being engaged with said catch, a second hook being attached to said piston, said second hook being attached to said chain;

positioning said second ends of said legs on opposite sides of said doorframe and abutting said foot panels against said perimeter edge; and actuating said urging member and pulling said doorframe away from said perimeter edge of said door orifice.

* * * * *